United States Patent
Griesinger et al.

[15] 3,674,885
[45] July 4, 1972

[54] ALKYLATION OF BENZENE UTILIZING FISCHER-TROPSCH OLEFIN-PARAFFIN MIXTURES

[72] Inventors: William K. Griesinger, Haverford, Pa.; Harold A. Sorgenti, Olympia Fields, Ill.; George W. Schell, Broomall, Pa.

[73] Assignee: Atlantic Richfield Company, New York, N.Y.

[22] Filed: Oct. 9, 1970

[21] Appl. No.: 79,389

[52] U.S. Cl. ............................................260/671 B, 260/649 R
[51] Int. Cl. .....................................................C07c 3/56
[58] Field of Search ..................................260/671 B, 649 R

[56] References Cited

UNITED STATES PATENTS

| | | |
|---|---|---|
| 2,745,861 | 5/1956 | Bodine...............................260/449 |
| 3,349,144 | 10/1967 | Alul et al............................260/671 B |
| 3,355,508 | 11/1967 | Moulden............................260/671 B |
| 3,426,086 | 2/1969 | Gray et al...........................260/671 B |
| 3,426,092 | 2/1969 | Carson et al. .....................260/671 B |
| 3,484,497 | 12/1969 | Berger................................260/671 B |

*Primary Examiner*—Curtis R. Davis
*Attorney*—Robert R. Cochran and John D. Peterson

[57] ABSTRACT

Paraffin-olefin mixtures synthesized by the Fischer-Tropsch process are used to alkylate benzene at high temperatures in the presence of an aluminum chloride catalyst at low catalyst volume to feed volume ratios. The paraffins are separated from the alkylation effluent and are recycled to a chlorination step from which the paraffin-chloroparaffin effluent mixture is combined with the fresh feed Fischer-Tropsch olefin-paraffin mixture and the combined feeds are used to alkylate the benzene.

7 Claims, 1 Drawing Figure

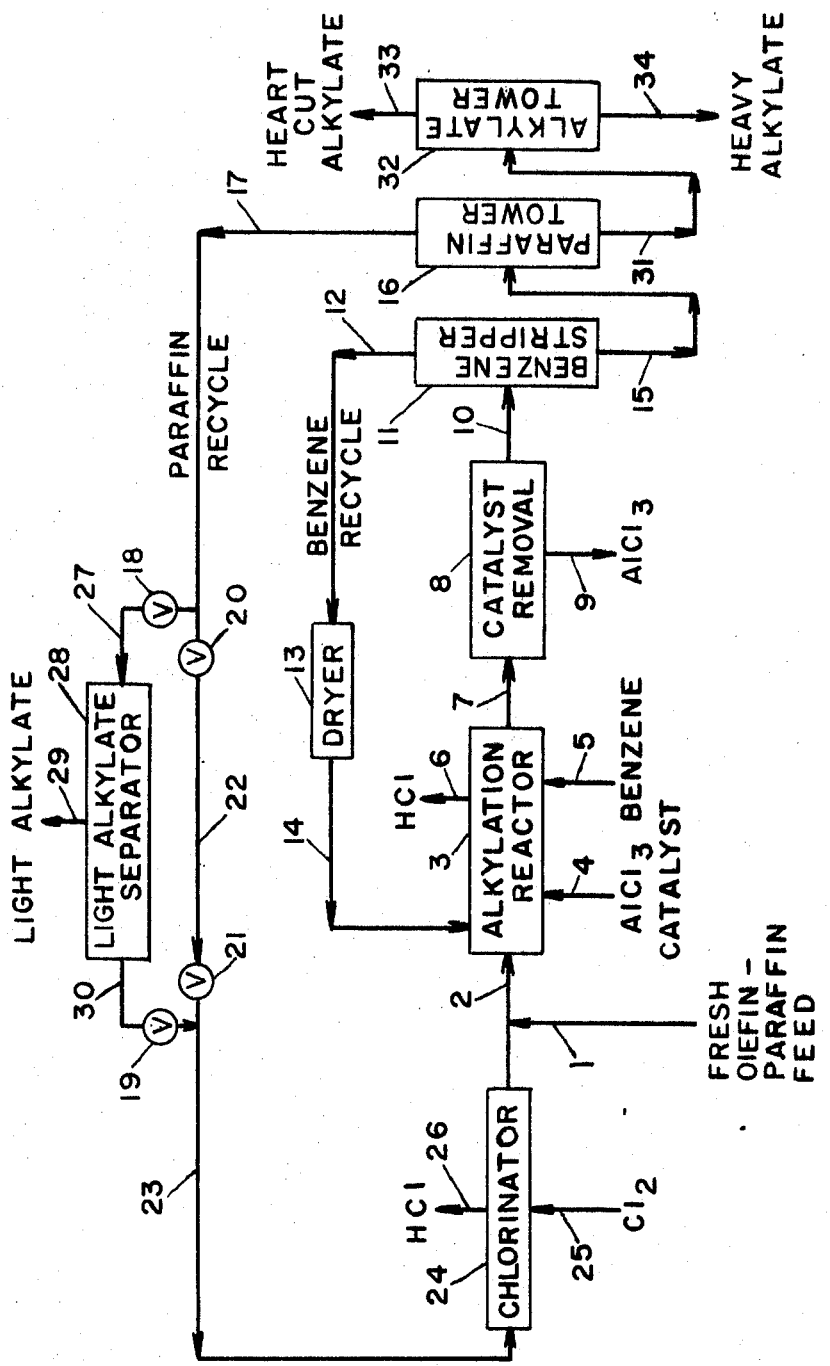
INVENTORS
WILLIAM K. GRIESINGER
HAROLD A. SORGENTI
GEORGE W. SCHELL
BY Robert R Cochran
ATTORNEY

3,674,885

ALKYLATION OF BENZENE UTILIZING FISCHER-TROPSCH OLEFIN-PARAFFIN MIXTURES

BACKGROUND OF THE INVENTION

1. Field of the Invention

This invention relates to a method for the alkylation of benzene at high temperatures in the presence of an aluminum chloride catalyst at low catalyst to feed ratios utilizing an olefin-paraffin stream from a Fischer-Tropsch synthesis plant. The paraffins are separated from the alkylation reaction effluent and are recycled to a chlorination step, from which the paraffin-chloroparaffin effluent is combined with the fresh feed olefin-paraffin mixture to the alkylation step.

2. Prior Art

In recent years the production of alkyl benzene sulfonates for use in detergent compositions has been limited to the linear alkyl benzene sulfonate type, by the requirement that the alkyl benzene sulfonate being easily bio-degradable. It was found that a convenient method for the preparation of such straight chain alkyl benzene sulfonates involved the separation of straight chain paraffins from petroleum kerosene fractions by the use of molecular sieves or urea adduction methods. These straight chain paraffins are then chlorinated to produce a mixture of paraffins and chloro-paraffins wherein the chloroparaffins are predominately mono-chloroparaffins. This mixture of paraffins and chloroparaffins is then utilized to alkylate benzene and the alkylated benzene is sulfonated to produce the desired linear alkyl benzene sulfonate. This method, in general, employs conventional low temperature alkylation temperatures ranging from 80° to 150° F. and preferably about 135° F. Likewise the method employs relatively high catalyst volume to fresh feed volume ratio to the alkylation zone.

Straight chain paraffin-olefin mixtures can be produced by the carbon monoxide-hydrogen or Fischer-Tropsch synthesis. Thus in South Africa an exceedingly large and modern Fischer-Tropsch plant utilizes coal as the raw material to produce a wide variety of chemicals including synthetic fuels. The hydrocarbon portion of the effluent from such processes, by the proper selection of catalysts and process conditions, is composed substantially entirely of a mixture of straight chain paraffins and olefins with very small amounts, if any, of branched-chain compounds. These paraffins and olefins obviously would be a desirable feed stock for use in the alkylation of benzene to produce linear alkyl benzene sulfonates. This mixture however, is not amenable to chlorination and therefore cannot be used directly in the paraffin-chloroparaffin alkylation process moreover, these mixtures of paraffins and olefins cannot be separated by simple distillation methods. Accordingly it has been proposed to introduce the paraffin olefin mixture into an alkylation zone together with a paraffin-chloroparaffin mixture from a chlorination reactor and recycle the paraffins to the chlorination reactor. It was found, however when this was attempted in a conventional plant that very poor yields of the desired heart cut alkylate were obtained.

The present invention obviates all of the difficulties in utilizing a Fischer-Tropsch olefin-paraffin mixture for the alkylation of benzene and provides a technologically and economically sound process for producing linear alkyl benzene sulfonates from the synthetic olefin-paraffin mixture produced in a Fischer-Tropsch process. This process has been made possible by the surprising discovery that the alkylation feed for alkylating benzene in the presence of an aluminum chloride catalyst can consist of a mixture of both chloroparaffins and olefins together with paraffins all in the same carbon number range to give the alkylated benzene product, which is of the same quality and yield as obtained when utilizing either a paraffin-chloroparaffin mixture or an olefin as the feed to the alkylation reaction provided high alkylation temperatures are employed together with a low catalyst volume to feed volume ratio.

SUMMARY OF THE INVENTION

In accordance with this invention a mixture of synthetic $C_9$ to $C_{14}$ olefins and $C_9$ to $C_{14}$ paraffins produced by the Fischer-Tropsch process and being predominately straight chain are utilized as the fresh feed to alkylate benzene utilizing a conventional aluminum chloride catalyst but employing alkylation temperatures considerably higher than conventional alkylation temperatures i.e., 190° to 300° F. and less than the conventional amount of catalyst. The effluent from the alkylation reactor after spent catalyst removal and neutralization is passed to a conventional distillation tower were benzene is taken overhead for recycling to the alkylation step. The bottoms from the benzene separation tower are passed to another distillation tower wherein the unreacted paraffins are taken overhead. This stream is recycled to a paraffin chlorination step wherein the paraffins are contacted with chlorine under conditions such that the conversion of paraffin to chloroparaffins is less than about 20 percent, thus producing predominately mono-chloroparaffins in the chloroparaffin fraction. The paraffin chloroparaffin stream from the chlorinator is admixed with the fresh feed olefin-paraffin mixture and the combined streams are utilized for the benzene alkylation. The paraffin tower bottoms are introduced into an alkylate tower wherein a heart cut alkylate fraction is taken overhead and a heavy alkylate fraction is taken as bottoms.

In a specific embodiment of the invention the light alkylate fraction which is contained in the paraffin overhead recycle stream is separated from the paraffins by the use of any of the known processes for separation of aromatics from paraffins including solvent extraction, extractive distillation or selective adsorption.

It is an object of this invention therefore to provide a method for the use of an olefin-paraffin mixture synthesized by the Fischer-Tropsch process for the alkylation of benzene in the production of linear alkyl benzenes to be used subsequently in the manufacture of linear alkyl benzene sulfonate detergents.

It is another object of this invention to provide a method for the economical utilization of Fischer-Tropsch synthesized ofefin-paraffin mixtures in the production of linear alkyl benzene sulfonates.

It is another object of this invention to provide a method for the alkylation of benzene with a Fischer-Tropsch synthesized olefin-paraffin mixture in the production of linear alkyl benzene sulfonates.

It is another object of this invention to provide a method for the alkylation of benzene with a Fischer-Tropsch synthesized olefin-paraffin mixture wherein the paraffins are separated from the alkylation reaction effluent, recycled to a paraffin chlorination step and the effluent from such step is combined with the fresh feed olefin-paraffin mixture to the alkylation reaction.

Other objects of this invention will be apparent from the description of the preferred embodiments and from the claims which follow.

DESCRIPTION OF THE DRAWING

In order to more fully understand the method of this invention, reference is made to the accompanying drawing which diagramatically represents a typical flow sheet embodying the process. Apparatus considered unnecessary to an understanding of the invention has been omitted.

Refering to the drawing the fresh olefin-paraffin feed is introduced through line 1 into line 2 which in turn delivers the stream to the alkylation reactor 3 where it is contacted with a conventional aluminum chloride catalyst introduced into the alkylation reactor 3 by means of line 4 and with benzene which is introduced in to reactor 3 by means of line 5. By-product hydrogen chloride produced during the alkylation reaction is removed from the alkylation reactor 3 by means of line 6.

The effluent from the alkylation reactor 3 consisting of alkylated benzenes, paraffins, unreacted benzene and catalyst is removed by means of line 7 and introduced into a catalyst removal separator 8 from which the catalyst is removed by means of line 9 in accordance with conventional separation techniques. In the catalyst removal separator 8 the reaction mixture can also be treated with a caustic solution to neutralize residual traces of catalyst and this solution is removed by a conventional settling means not shown.

The effluent from the catalyst removal separator 8 consisting of unreacted benzene, paraffins and the alkylated benzenes is removed by line 10 and introduced into the benzene stripper 11. The benzene is distilled overhead by means of line 12 and dried by conventional means in dryer 13 from which it is recycled by line 14 to the alkylation reactor 3. The bottoms fraction from the benzene stripper 11 is conducted by means of line 15 into the paraffin tower 16.

The paraffin recycle stream containing the light alkylate, i.e., low molecular weight alkylated benzenes, is taken overhead from the paraffin tower 16 by means of line 17. In general, the light alkylate fraction comprises alkyl benzenes having eight carbons or less in the alkyl side chain. This fraction may constitute up to about 20 percent by weight of the total paraffin recycle stream. If it is desired not to separate the light alkylate fraction from the paraffins, valves 18 and 19 are closed and valves 20 and 21 are opened so that the paraffin recycle stream containing the light alkylate is conducted by means of by-pass line 22 into line 23 which in turn introduces the recycle stream into chlorinator 24.

Chlorine is introduced into chlorinator 24 through line 25 and the by-product hydrogen chloride is removed from the chlorinator by line 26. The chlorination is carried out in chlorinator 24 in such a manner that less than about 20 percent of the paraffins are converted to chloroparaffins thereby maximizing the mono-chloroparaffins in the chloroparaffin fraction. The effluent from the chlorinator consisting of the unchlorinated paraffins, the chlorinated paraffins and the light alkylate, a considerable portion of which at least has been chlorinated, generally on the side chain, is removed by means of line 2 where it is combined with the fresh feed from line 1 and introduced into the alkylation reactor 3.

In the alkylation reactor 3 the chloroparaffins as well as the olefins react with the benzene to produce the desired alkylated benzenes whereas the chlorinated light alkylate reacts with the benzene to produce the undesired diphenyl alkanes, i.e., the heavy alkylate fraction.

If it is desired to remove the light alkylate fraction from the paraffin recycle stream valves 20 and 21 are closed and valves 18 and 19 are opened so that the paraffin recycle stream in line 17 is conducted by line 27 into light alkylate separator 28 from which the light alkylate is removed by line 29 and the desired paraffin recycle stream free of light alkylate is removed by line 30 and introduced into line 23 for chlorination in chlorinator 24. In this embodiment the effluent from the chlorinator 24 consists solely of the paraffin-chloroparaffin mixture in line 2. The light alkylate separator 28 can be any conventional means for the separation of paraffins from aromatics such as solvent extraction, extractive distillation or selective adsorption. These processes are well known and widely employed commercially for the separation of paraffins from aromatics where the respective compounds boil in substantially the same range as in the instant situation and thus cannot be separated by simple fractional distillation.

The bottoms fraction from the paraffin tower 16 is transferred by line 31 to alkylate tower 32. This bottoms fraction consists of a mixture of the desired "heart-cut" alkylate, i.e., alkylated benzenes in the desired molecular weight range, generally the $C_9$ to $C_{14}$ side chain compounds, together with the heavy alkylate consisting of the dialkyl benzenes and diphenyl alkanes together with other heavy aromatics. The desired heart cut alkylate is taken overhead by means of line 33 from alkylate tower 32 while the heavy alkylate is removed as a bottoms fraction by means of line 34.

DESCRIPTION OF THE PREFERRED EMBODIMENTS

The fresh feed stock to the instant process can consist of any ratio of olefins to paraffins produced by a Fischer-Tropsch synthesis process. The hydrocarbon fraction from the Fischer-Tropsch process is fractionated to provide the desired carbon number range of olefin-paraffin mixture, in most instances the $C_9$ to $C_{14}$ fraction is preferred and in particular the $C_{10}$ to $C_{14}$ fraction, however, a $C_9$ to $C_{16}$ or wider molecular weight range fraction can be employed depending upon the alkylate product desired. For synthetic detergent manufacture the desired range is generally the $C_9$ to $C_{14}$ range with the most preferable range being the $C_{10}$ to $C_{14}$ range.

In general, the olefin-paraffin ratio from the Fischer-Tropsch synthesis ranges from 25:75 to 75:25 in weight percent, however, wider variations than these are completely operable in the method of the instant invention. It has been pointed out that the olefin-paraffin mixture from the Fischer-Tropsch process is almost completely straight chain which is preferred for use in producing bio-degradable detergents. If small amounts of branched chain compounds are present they are operable in the process but may effect the quality and the bio-degradability of the finished detergent to some extent.

The alkylation reaction is carried out preferably at temperatures between 190° and 300° F. with about 200° to 270° F. being preferred. It is also preferred to carry out the reaction at pressures of from 5 to 50 psig. and more preferably from 15 to 25 psig. In these respects the alkylation differs from the prior art conventional alkylation reactions which were generally carried out at temperatures in the range of from 80° to 150° F. with the majority being in the 130° to 135° F. range and at substantially atmospheric pressure.

The catalyst which is employed in the alkylation step can be any conventional aluminum chloride alkylation catalyst. Such catalysts are well-known and in general range from about 35 to 50 weight percent of aluminum chloride complexed with hydrocarbons to give the well-known "red oil" type catalyst. These catalysts are generally employed in the form of a slurry. It has been found however, that by using the process of the instant invention the amount of catalyst employed is from one-fifth to one-seventh that formerly required when using conventional low temperature-low pressure alkylation. Thus, in the instant process a ratio of 1 volume of catalyst to 10 volumes of the combined chloroparaffin-olefin feed to the alkylation reaction is preferred. This volume of course, can be varied and one-half to two or three times this amount can be used, however, since catalyst is expensive, it is preferred to use as small an amount as is suitable in order to provide an economical process commensurate with a high quality product. In general, the aluminum chloride portion of the catalyst ranges from about 35 to 45 weight percent of the slurry complex.

The aluminum chloride which is separated from the alkylation reactor has frequently become deactivated to some extent and accordingly, can be refortified by the addition of fresh catalyst, i.e., aluminum chloride, with removal of a purge stream, all in accordance with well-known procedures. As pointed out in the description of the drawing of the process, hydrogen chloride is produced as an off-gas both from the chlorinator and the alkylation reactor. The hydrogen chloride from the chlorinator is generally contaminated with small amounts of entrained chlorine, and this chlorine can be removed by scrubbing the off-gas stream with the paraffins to be recycled to the chlorinator.

The chlorination step is generally carried out at 200° to 400° F. under conditions such that 20 mole percent or less of the paraffins are chlorinated in order to maximize the mono-chloroparaffin fraction of the chloroparaffins, thus improving the quality of the finished alkylate product.

The hydrogen chloride from the alkylation reactor frequently contains entrained benzene, which can be scrubbed from the hydrogen chloride stream by the use of light alkylate, if it is removed from the paraffin recycle stream this scrubbing liquid is then recycled to the alkylation zone or alternatively, heavy alkylate may be used for scrubbing and recycled. These procedures provide highly pure hydrogen chloride which can be used either in the production of pure hydrochloric acid or in hydrochlorination reactions.

A material balance has been made utilizing the flow data for actual plant operations. The weights given are in pounds although it will be understood, of course, that these are ratios rather than actual flows in the commercial plant.

Referring again to the drawing, fresh olefin-paraffin feed consisting of 18.8 lbs. of $C_9$ to $C_{14}$ paraffins and 43.9 lbs. of $C_9$ to $C_{14}$ olefins are introduced into the process through line 1 and are combined with 98.7 lbs. of a paraffin-chloroparaffin mixture in line 2 from chlorinator 24. In this embodiment the light alkylate product is removed from the recycle paraffin stream. Aluminum chloride catalyst in the form of the usual slurry is introduced into the alkylation reactor 3 through line 4, the volume of the aluminum chloride slurry being approximately 1 volume per 10 volumes of the combined chloroparaffin olefin mixture. Fresh benzene amounting to 29.3 lbs. is introduced into the alkylation reactor 3 by line 5. Recycle benzene in an amount of 328.7 lbs. is introduced into alkylation reactor 3 by line 14. There is produced of 4.9 lbs. of hydrogen chloride in the alkylation reaction which is by line 6 from the alkylation reactor. The alkylation carried out at about 200° F. and 15 psig.

After catalyst removal in the catalyst separator 8, 514.5 lbs. of effluent is introduced into the benzene stripper 11 through line 10. The benzene recycle from benzene stripper 11 is removed through line 12 dried in dryer 13 and provides the 328.7 lbs. of recycle benzene heretofore described. The bottoms from the benzene stripper amounts to 185.8 lbs. and this is introduced through line 15 into paraffin tower 16 from which 98.4 lbs. of crude recycle paraffin is removed through line 12. The light alkylate fraction is removed in light alkylate separator 28 through line 29 and amounts to 4.3 lbs. of light alkylate giving 94.4 lbs. of purified recycle paraffin in line 23 which is introduced into chlorinator 24. There is introduced into chlorinator 24, 9.4 lbs. of chlorine by line 25 and hydrogen chloride amounting to 4.8 lbs. is removed through line 26. This provides the 98.7 lbs. of paraffin-chloroparaffin mixture removed through line 2 which has been described and it will be seen that the chloroparaffins amount to less than about 20 mole percent.

The bottoms from paraffin tower 16, removed by line 31, amounts to 87.4 lbs. and this is introduced into the alkylate tower 32 from which 73.5 lbs. of the desired heart cut alkylate are removed overhead and 13.9 lbs. of heavy alkylate are removed as a bottoms.

When the light alkylate is allowed to remain in the recycle paraffin stream, slightly different flows are utilized. With the same fresh feed mixture of olefin and paraffin in line 1, 121.7 lbs. of effluent from chlorinator 24 in line 2 is combined with the fresh feed and introduced into the alkylation reactor 3. This effluent from the chlorinator is a combination of paraffins, chloroparaffins, light alkylate and chlorinated light alkylate. Fresh benzene amounting to 31.4 lbs. is introduced into the alkylation reactor together with 350.9 lbs. of recycle benzene. The amount of aluminum chloride catalyst is again based on the volume of chloroparaffin and olefin feed. The hydrogen chloride off-gas amounts to 6.5 lbs. and after catalyst removal, 560.2 lbs. of effluent are removed via line 10 and introduced into benzene stripper 11 from which the 350.9 lbs. of recycle benzene are obtained. The bottoms from the benzene stripper amounts to 209.3 lbs. which is introduced by line 15 into paraffin tower 16. The crude recycle paraffin from tower 16 in line 17 amounts to 115.6 lbs. since it contains light alkylate. This entire stream is recycled to the chlorinator wherein 11.8 lbs. of chlorine are introduced and 5.7 lbs. of hydrogen chloride is taken off through line 26.

The bottoms from the paraffin tower in line 31 amounts to 93.7 lbs. and this stream is introduced into alkylate tower 32 from which 73.5 lbs. of the desired heart cut alkylate is obtained and 20.2 lbs. of heavy alkylate taken as the bottoms fraction.

It will be seen that if the light alkylate is removed from the crude recycle paraffin there is provided savings, both in the amount of chlorine and fresh benzene required and, in addition, there is produced less heavy alkylate while there is produced the same quantity of desired heart cut alkylate in both methods. These savings, of course, must be balanced against the cost of removing the light alkylate from the recycle paraffin stream. In general, however, the light alkylate can either be dealkylated to provide benzene and light paraffins for use in gasoline or can be utilized in other chemical processes.

The following example is provided to show that the presence of olefins has no effect on the yield or quality of alkylate produced when these are used to alkylate benzene in conjunction with chlorinated paraffins under the alkylation conditions of this invention.

EXAMPLE

A mixture containing 218 grams of benzene, 337 grams of dodecane and 42 grams of a mixture consisting of 19 weight percent dodecene-1, 61 weight percent $C_{12}$ monochlorides and 20 weight percent polychlorides was reacted at 200° F. for 20 minutes. A conventional aluminum chloride catalyst slurry was utilized in a slurry to primary chloride ratio of 0.6 volumes per volume. This amounted to approximately 1 volume of slurry per 10 volumes of the combined olefin-monochloride feed. The product mixture was distilled to yield 85.7 weight percent paraffin, 12.3 weight percent heart cut alkylate, 1.3 weight percent heavy alkylate and 0.7 weight percent light alkylate.

The heart cut had a paraffin (dodecane) content of 1 weight percent, a dodecylbenzene content of 91.1 weight percent, indans and/or tetralins amounting to 6.3 weight percent and diphenyl compounds amounting to 1.6 weight percent. It was found that the quality and the yield thus obtained were essentially the same as those obtained when alkylating a feed consisting of paraffins and chloroparaffins of the same ratio and wherein the chloroparaffins consisted of 80 percent monochloroparaffins and 20 percent poly-chloroparaffins. This experiment carried out under conditions wherein precise analytical determinations could be made and under closely controlled reaction conditions demonstrated that by the method of this invention a Fischer-Tropsch olefin-paraffin mixture can be used to alkylate benzene to give a product equivalent in yield and quality to that obtainable by the use of a straight chain chloroparaffin feed obtained in the conventional manner.

We claim:

1. A method for the alkylation of benzene with a paraffin-olefin mixture synthesized by the Fischer-Tropsch process which comprises contacting benzene with said paraffin-olefin mixture in the presence of an aluminum chloride catalyst at a temperature in the range of from 190° to 300° F. to produce an alkylation mixture comprising said alkylated benzenes and paraffins, removing a fraction comprising said paraffins from said alkylation mixture, contacting said paraffin fraction with chlorine at a conversion of less than about 20 per cent to produce a mixture comprising unreacted paraffins and less than about 20 mole percent chloroparaffins, combining said paraffin-chloroparaffin mixture with said paraffin-olefin mixture for contacting said benzene and recovering the desired alkylated benzenes from said alkylation mixture, the volume ratio of aluminum chloride catalyst to the volume of the combined volumes of olefins and chloroparaffins being in the range of from 0.5:10 to 3.0:10.

2. The method according to claim 1, wherein the paraffins and olefins in said paraffin-olefin mixture contain from nine to 16 carbon atoms.

3. The method according to claim 1, wherein the paraffins and olefins contain nine to 14 carbon atoms.

4. The method according to claim 1, wherein the paraffins and olefins contain 10 to 14 carbon atoms.

5. The method according to claim 1, wherein the temperature is in the range of from 200° to 270° F.

6. The method according to claim 1, wherein the volume ratio of aluminum chloride catalyst to the volume of the combined olefins and chloroparaffins is about 1:10.

7. The method according to claim 1, wherein the light alkylate fraction contained in the paraffins removed from the alkylation mixture is removed from said paraffin stream prior to contacting said paraffins with chlorine.

* * * * *